(12) United States Patent
Hutchins et al.

(10) Patent No.: US 10,472,555 B2
(45) Date of Patent: Nov. 12, 2019

(54) POLYMER GEL FOR WATER CONTROL APPLICATIONS

(71) Applicant: SCHLUMBERGER TECHNOLOGY CORPORATION, Sugar Land, TX (US)

(72) Inventors: Richard Donald Hutchins, Sugar Land, TX (US); Syed Afaq Ali, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/091,553

(22) PCT Filed: Apr. 6, 2017

(86) PCT No.: PCT/US2017/026250
§ 371 (c)(1),
(2) Date: Oct. 5, 2018

(87) PCT Pub. No.: WO2017/176952
PCT Pub. Date: Oct. 12, 2017

(65) Prior Publication Data
US 2019/0106616 A1    Apr. 11, 2019

Related U.S. Application Data

(60) Provisional application No. 62/320,019, filed on Apr. 8, 2016.

(51) Int. Cl.
*C09K 8/512* (2006.01)
*E21B 33/138* (2006.01)

(52) U.S. Cl.
CPC ............ *C09K 8/512* (2013.01); *E21B 33/138* (2013.01)

(58) Field of Classification Search
CPC .............................. C09K 8/512; E21B 33/138
See application file for complete search history.

(56) References Cited

U.S. PATENT DOCUMENTS

| 3,491,049 A | 1/1970 | Gibson et al. |
| 4,773,481 A | 9/1988 | Allison et al. |

(Continued)

FOREIGN PATENT DOCUMENTS

| EP | 0538989 A2 | 4/1993 |
| EP | 1092693 A2 | 4/2001 |

(Continued)

OTHER PUBLICATIONS

Al-Muntasheri et al., "A Study of Polyacrylamide-Based Gels Crosslinked With Polyethyleneimine", SPE 105925, 2007 International Symposium on Oilfield Chemistry, Feb. 28-Mar. 2, 2007; 9 pages.

(Continued)

*Primary Examiner* — Zakiya W Bates
*Assistant Examiner* — Crystal J Miller
(74) *Attorney, Agent, or Firm* — Andrea E. Tran

(57) ABSTRACT

A method for reducing a permeability of at least one zone in a subterranean formation that includes introducing a treatment fluid to at least one permeable zone in a subterranean formation. The treatment fluid contains a solvent, a crosslinking agent, and a water-soluble polymer that is a copolymer of an acrylamide monomer and an n-vinyl amide monomer, or a terpolymer of an acrylamide monomer, an n-vinyl amide monomer, and an acrylic-acid based monomer. The treatment fluid is then allowed to crosslink and form a gel in the zone.

17 Claims, 2 Drawing Sheets

(56) References Cited

U.S. PATENT DOCUMENTS

| | | | |
|---|---|---|---|
| 4,917,186 A * | 4/1990 | Mumallah | C09K 8/512 |
| | | | 166/270 |
| 5,133,408 A | 7/1992 | Tackett | |
| 5,399,269 A * | 3/1995 | Moradi-Araghi | C08K 5/0025 |
| | | | 166/270 |
| 5,447,906 A | 9/1995 | Chaudhari et al. | |
| 5,480,933 A | 1/1996 | Fox et al. | |
| 5,820,670 A | 10/1998 | Chatterji et al. | |
| 5,836,392 A | 11/1998 | Urlwin-Smith | |
| 6,109,350 A | 8/2000 | Nguyen et al. | |
| 6,176,315 B1 | 1/2001 | Reddy et al. | |
| 6,192,986 B1 | 2/2001 | Urlwin-Smith | |
| 6,196,317 B1 | 3/2001 | Hardy | |
| 6,220,354 B1 | 4/2001 | Chatterji et al. | |
| 6,308,777 B2 | 10/2001 | Chatterji et al. | |
| 6,364,016 B1 | 4/2002 | Dalrymple et al. | |
| 6,476,196 B1 | 11/2002 | Ljunggren et al. | |
| 6,500,252 B1 | 12/2002 | Chatterji et al. | |
| 6,607,035 B1 | 8/2003 | Reddy et al. | |
| 6,616,753 B2 | 9/2003 | Reddy et al. | |
| 6,702,044 B2 | 3/2004 | Reddy et al. | |
| 6,764,981 B1 | 7/2004 | Eoff et al. | |
| 6,823,940 B2 | 11/2004 | Reddy et al. | |
| 6,838,417 B2 | 1/2005 | Bouwmeester et al. | |
| 6,843,841 B2 | 1/2005 | Reddy et al. | |
| 6,848,519 B2 | 2/2005 | Reddy et al. | |
| 6,953,090 B2 | 10/2005 | Vijn et al. | |
| 6,981,552 B2 | 1/2006 | Reddy et al. | |
| 7,007,752 B2 | 3/2006 | Reddy et al. | |
| 7,066,284 B2 | 6/2006 | Wylie et al. | |
| 7,091,160 B2 | 8/2006 | Dao et al. | |
| 7,114,568 B2 | 10/2006 | Eoff et al. | |
| 7,117,942 B2 | 10/2006 | Dalrymple et al. | |
| 7,128,148 B2 | 10/2006 | Eoff et al. | |
| 7,131,493 B2 | 11/2006 | Eoff et al. | |
| 7,159,656 B2 | 1/2007 | Eoff et al. | |
| 7,182,136 B2 | 2/2007 | Dalrymple et al. | |
| 7,192,527 B2 | 3/2007 | Reddy | |
| 7,207,387 B2 | 4/2007 | Eoff et al. | |
| 7,216,707 B2 | 5/2007 | Eoff et al. | |
| 7,225,879 B2 | 6/2007 | Wylie et al. | |
| 7,287,587 B2 | 10/2007 | Reddy et al. | |
| 7,331,390 B2 | 2/2008 | Eoff et al. | |
| 7,341,117 B2 | 3/2008 | Wylie et al. | |
| 7,343,976 B2 | 3/2008 | Segura | |
| 7,360,598 B1 | 4/2008 | Lewis et al. | |
| 7,374,690 B2 | 5/2008 | Reddy | |
| 7,388,045 B1 | 6/2008 | Lewis et al. | |
| 7,523,784 B2 | 4/2009 | Lewis et al. | |
| 7,563,750 B2 | 7/2009 | Eoff et al. | |
| 7,571,777 B2 | 8/2009 | Wylie et al. | |
| 7,576,040 B2 | 8/2009 | Lewis et al. | |
| 7,595,283 B2 | 9/2009 | Eoff et al. | |
| 7,741,251 B2 | 6/2010 | Eoff et al. | |
| 7,842,652 B2 | 11/2010 | Lewis et al. | |
| 7,934,557 B2 | 5/2011 | Nguyen | |
| 7,992,656 B2 | 8/2011 | Dusterhoft et al. | |
| 8,011,446 B2 | 9/2011 | Wylie et al. | |
| 8,091,638 B2 | 1/2012 | Dusterhoft et al. | |
| 8,181,703 B2 | 5/2012 | Sierra et al. | |
| 8,251,141 B2 | 8/2012 | Eoff et al. | |
| 8,278,250 B2 | 10/2012 | Dalrymple et al. | |
| 8,322,421 B2 | 12/2012 | Reddy et al. | |
| 8,343,896 B2 | 1/2013 | Eoff et al. | |
| 8,418,764 B2 | 4/2013 | Dusterhoft et al. | |
| 8,420,576 B2 | 4/2013 | Eoff et al. | |
| 8,453,741 B2 | 6/2013 | van Zanten | |
| 8,522,874 B2 | 9/2013 | Reddy et al. | |
| 8,592,353 B2 | 11/2013 | Dalrymple et al. | |
| 8,618,026 B2 | 12/2013 | Ezell et al. | |
| 8,623,793 B2 | 1/2014 | Eoff et al. | |
| 8,703,659 B2 | 4/2014 | Dalrymple et al. | |
| 8,714,249 B1 | 5/2014 | Tang | |
| 8,727,002 B2 | 5/2014 | Reyes | |
| 8,794,322 B2 | 8/2014 | Reyes et al. | |
| 8,796,187 B2 | 8/2014 | Reyes et al. | |
| 8,813,843 B2 | 8/2014 | Braganza et al. | |
| 8,813,845 B2 | 8/2014 | Ezell et al. | |
| 8,881,811 B2 | 11/2014 | Reyes | |
| 8,893,790 B2 | 11/2014 | Reyes et al. | |
| 8,950,492 B2 | 2/2015 | Maghrabi et al. | |
| 8,955,587 B2 | 2/2015 | Sherman et al. | |
| 8,985,212 B1 | 3/2015 | Crespo et al. | |
| 8,991,495 B2 | 3/2015 | Curtice | |
| 9,004,168 B2 | 4/2015 | Reyes et al. | |
| 9,018,140 B2 | 4/2015 | Weaver et al. | |
| 9,051,506 B2 | 6/2015 | Reddy et al. | |
| 9,090,811 B2 | 7/2015 | Reddy et al. | |
| 9,127,193 B2 | 9/2015 | Reddy et al. | |
| 9,150,781 B2 | 10/2015 | Reddy et al. | |
| 9,169,433 B2 | 10/2015 | Nguyen et al. | |
| 9,175,206 B2 | 11/2015 | Reddy et al. | |
| 9,193,899 B2 | 11/2015 | Reyes et al. | |
| 2004/0149431 A1 | 8/2004 | Wylie et al. | |
| 2005/0178549 A1 | 8/2005 | Eoff et al. | |
| 2005/0194140 A1 | 9/2005 | Dalrymple et al. | |
| 2005/0241855 A1 | 11/2005 | Wylie et al. | |
| 2005/0261139 A1 | 11/2005 | Reddy et al. | |
| 2006/0137875 A1 | 6/2006 | Dusterhoft et al. | |
| 2006/0185850 A1 | 8/2006 | Segura | |
| 2006/0234871 A1 | 10/2006 | Dalrymple et al. | |
| 2006/0234874 A1 | 10/2006 | Eoff et al. | |
| 2006/0260812 A1 * | 11/2006 | Eoff | C09K 8/5083 |
| | | | 166/279 |
| 2006/0266522 A1 | 11/2006 | Eoff et al. | |
| 2006/0278390 A1 * | 12/2006 | Reddy | C09K 8/512 |
| | | | 166/270 |
| 2006/0283592 A1 | 12/2006 | Sierra et al. | |
| 2007/0125714 A1 | 6/2007 | Reddy | |
| 2007/0187146 A1 | 8/2007 | Wylie et al. | |
| 2008/0087423 A1 | 4/2008 | Wylie et al. | |
| 2008/0169101 A1 | 7/2008 | Lewis et al. | |
| 2008/0171806 A1 | 7/2008 | Lewis et al. | |
| 2008/0196897 A1 | 8/2008 | Nguyen | |
| 2009/0264557 A1 | 10/2009 | Lewis et al. | |
| 2009/0308616 A1 | 12/2009 | Wylie et al. | |
| 2011/0005773 A1 | 1/2011 | Dusterhoft et al. | |
| 2011/0114318 A1 | 5/2011 | Ezell et al. | |
| 2011/0214857 A1 | 9/2011 | Al-Muntasheri et al. | |
| 2011/0214865 A1 | 9/2011 | Reddy et al. | |
| 2011/0214866 A1 | 9/2011 | Reddy et al. | |
| 2011/0214867 A1 | 9/2011 | Reddy et al. | |
| 2012/0048550 A1 | 3/2012 | Dusterhoft et al. | |
| 2012/0145401 A1 | 6/2012 | Reyes | |
| 2012/0168166 A1 | 7/2012 | Dalrymple et al. | |
| 2012/0172263 A1 | 7/2012 | Reyes et al. | |
| 2012/0258894 A1 | 10/2012 | Eoff et al. | |
| 2012/0264885 A1 | 10/2012 | Eoff et al. | |
| 2012/0279708 A9 | 11/2012 | Reddy et al. | |
| 2012/0283150 A1 | 11/2012 | Ezell et al. | |
| 2012/0298357 A1 | 11/2012 | Ezell et al. | |
| 2013/0020081 A1 | 1/2013 | Maghrabi et al. | |
| 2013/0020083 A1 | 1/2013 | Wagie et al. | |
| 2013/0056199 A1 | 3/2013 | Reddy et al. | |
| 2013/0098611 A1 | 4/2013 | Salgaonkar et al. | |
| 2013/0098618 A1 | 4/2013 | Braganza et al. | |
| 2013/0118744 A1 | 5/2013 | Gamage et al. | |
| 2013/0213656 A1 | 8/2013 | Ezell | |
| 2013/0233559 A1 | 9/2013 | van Zanten et al. | |
| 2013/0269936 A1 | 10/2013 | Reyes et al. | |
| 2013/0269941 A1 | 10/2013 | Reyes et al. | |
| 2013/0269944 A1 | 10/2013 | Reyes et al. | |
| 2013/0277054 A1 | 10/2013 | Reddy et al. | |
| 2013/0306314 A1 | 11/2013 | Curtice | |
| 2013/0310284 A1 | 11/2013 | Weaver et al. | |
| 2013/0312961 A1 | 11/2013 | Reyes et al. | |
| 2014/0048260 A1 | 2/2014 | Reddy et al. | |
| 2014/0048261 A1 | 2/2014 | Reyes | |
| 2014/0083696 A1 | 3/2014 | Nguyen et al. | |
| 2014/0090843 A1 | 4/2014 | Boul et al. | |
| 2014/0116701 A1 | 5/2014 | Tang | |
| 2014/0116703 A1 | 5/2014 | Reddy et al. | |
| 2014/0116704 A1 | 5/2014 | Reddy et al. | |
| 2014/0138092 A1 | 5/2014 | Reddy et al. | |

(56) References Cited

U.S. PATENT DOCUMENTS

| | | |
|---|---|---|
| 2014/0190700 A1 | 7/2014 | Tang et al. |
| 2014/0224489 A1 | 8/2014 | Al-Muntasheri et al. |
| 2014/0262289 A1 | 9/2014 | Reyes et al. |
| 2014/0287968 A1 | 9/2014 | Reyes et al. |
| 2014/0290692 A1 | 10/2014 | Hall et al. |
| 2014/0290958 A1 | 10/2014 | Marr et al. |
| 2014/0296113 A1 | 10/2014 | Reyes et al. |
| 2014/0329726 A1 | 11/2014 | Ezell et al. |
| 2014/0338916 A1* | 11/2014 | Vasquez ............... C09K 8/52 166/312 |
| 2014/0342953 A1 | 11/2014 | Reyes et al. |
| 2014/0349895 A1 | 11/2014 | Wagle et al. |
| 2014/0352969 A1 | 12/2014 | Chung et al. |
| 2014/0357536 A1 | 12/2014 | Maghrabi et al. |
| 2014/0367111 A1 | 12/2014 | Gamage et al. |
| 2015/0038645 A1 | 2/2015 | Reyes et al. |
| 2015/0114649 A1 | 4/2015 | Osorio et al. |
| 2015/0267520 A1 | 9/2015 | Liang et al. |
| 2015/0284622 A1 | 10/2015 | Reddy et al. |
| 2015/0300140 A1 | 10/2015 | Eoff et al. |
| 2015/0315885 A1 | 11/2015 | Reyes et al. |
| 2015/0361321 A1 | 12/2015 | Reddy et al. |

FOREIGN PATENT DOCUMENTS

| | | |
|---|---|---|
| EP | 1201618 A2 | 5/2002 |
| EP | 1201874 A1 | 5/2002 |
| EP | 1319798 A1 | 6/2003 |
| EP | 1369551 A1 | 12/2003 |
| EP | 1375819 A1 | 1/2004 |
| EP | 1319798 B1 | 4/2005 |
| EP | 1092693 B1 | 12/2008 |
| EP | 2009076 A1 | 12/2008 |
| EP | 1375819 B1 | 7/2009 |
| EP | 2451887 B1 | 5/2012 |
| WO | 2004101706 A1 | 11/2004 |
| WO | 2005071219 A2 | 8/2005 |
| WO | 2006106287 A1 | 10/2006 |
| WO | 2008084226 A2 | 7/2008 |
| WO | 2008110798 A2 | 9/2008 |
| WO | 2009112808 A2 | 9/2009 |
| WO | 2010041032 A1 | 4/2010 |
| WO | 2011018604 A1 | 2/2011 |
| WO | 2011023966 A1 | 3/2011 |
| WO | 2011061504 A2 | 5/2011 |
| WO | 2013012577 A1 | 1/2013 |
| WO | 2013012988 A1 | 1/2013 |
| WO | 2013154711 A1 | 10/2013 |
| WO | 2013162763 A1 | 10/2013 |
| WO | 2014107146 A1 | 7/2014 |
| WO | 2014110110 A1 | 7/2014 |
| WO | 2014150701 A1 | 9/2014 |
| WO | 2014160644 A1 | 10/2014 |
| WO | 2015016911 A1 | 2/2015 |
| WO | 2015016934 A1 | 2/2015 |
| WO | 2015034466 A1 | 3/2015 |
| WO | 2015038146 A1 | 3/2015 |
| WO | 2015047211 A1 | 4/2015 |
| WO | 2015057215 A1 | 4/2015 |
| WO | 2015060823 A1 | 4/2015 |
| WO | 2015065351 A1 | 5/2015 |
| WO | 2015065378 A1 | 5/2015 |
| WO | 2015065384 A1 | 5/2015 |
| WO | 2015065575 A1 | 5/2015 |
| WO | 2015065992 A1 | 5/2015 |
| WO | 2015069236 A1 | 5/2015 |
| WO | 2015085177 A1 | 6/2015 |
| WO | 2015094355 A1 | 6/2015 |
| WO | 2015102802 A1 | 7/2015 |
| WO | 2015112132 A1 | 7/2015 |
| WO | 2015126364 A1 | 8/2015 |
| WO | 2015126390 A1 | 8/2015 |
| WO | 2015138018 A1 | 9/2015 |
| WO | 2015152919 A1 | 10/2015 |
| WO | 2015174982 A1 | 11/2015 |
| WO | 2015174986 A1 | 11/2015 |
| WO | 2015174987 A1 | 11/2015 |
| WO | 2015183249 A1 | 12/2015 |
| WO | 2015191064 A1 | 12/2015 |
| WO | 2016007130 A1 | 1/2016 |
| WO | 2016007149 A1 | 1/2016 |

OTHER PUBLICATIONS

Hardy et al., "The First Carbonate Field Application of a New Organically Crosslinked Water Shutoff Polymer System", SPE 50738, 1999 SPE International Symposium on Oilfield Chemistry, Feb. 16-19, 1999, 16 pages.

Moradi-Araghi et al., "Hydrolysis and Precipitation of Polyacrylamides in Hard Brines at Elevated Temperatures", SPE 13033, SPE Reservoir Engineering, May 1987, pp. 189-198.

Reddy, B. R. et al. "A Natural Polymer-Based Cross-Linker System for Conformance Gel Systems". SPE Journal, pp. 99-106. Paper SPE 84937, Jun. 2003.

International Search Report and Written Opinion issued in International Patent Appl. No. PCT/US2017/026250 dated Jul. 19, 2017; 13 pages.

Doe et al., "Development and Evaluation of EOR Polymers suitable for Hostile Environments Part 1: Copolymers of Vinylpyrrolidone and Acrylamide", SPE 14233, SPE Reservoir Engineering, Nov. 1987, pp. 461-467.

Moradi-Araghi et al., "Development and Evaluation of EOR Polymers Suitable for Hostile Environments: II—Copolymers of Acrylamide and Sodium AMPS", SPE 16273, SPE International Symposium on Oilfield Chemistry, Feb. 4-6, 1987, pp. 319-326.

* cited by examiner

POLYMER GEL FOR WATER CONTROL APPLICATIONS

CROSS-REFERENCE TO RELATED APPLICATIONS

This application claims priority to and the benefit of U.S. Provisional Application No. 62/320,019, titled "ROBUST POLYMER GEL FOR WATER CONTROL APPLICATIONS," filed Apr. 8, 2016, the entire disclosure of which is hereby incorporated herein by reference.

BACKGROUND

The production of oil or gas from a subterranean formation may include some amount of water, the source of the water being a water producing zone in communication with an oil or gas region through a fracture, a high-permeability streak or a high-permeability zone, and the like. Controlling the water control can be problematic. One such problem regards shutting off fractures or fissures in carbonate reservoirs without impacting the hydrocarbon production. The fissure or fracture tends to dominate flow (relative to the matrix flow) to a producing well. For example, the flow of hydrocarbons may move from the matrix into the fractures, and then into one or more main fractures that intersect the wellbore. Because of the huge flow potential in a sizable opening, a large fluid solution is utilized to resist extrusion after a well is treated and placed on production. A reservoir may also contain a range of fissures, fractures, and vugs, each of which has the potential to flow. Vugs have both flow potential and large storage capacity, while the capacity of fissures and fractures depend upon width and cementation. Such features cannot be easily mapped, leading to difficulties in designing a plugging treatment.

Existing well treatment solutions addressing these problems are generally referred to as lost circulation material (LCM), lost circulation pills, plugs, gels, cement plugs, formation damage plugs, solids laden plugs, bentonite plugs, and fiber plugs, among other examples. Some solutions include pumping water-reactive materials in a non-aqueous fluid (such as clay, bentonite, organic polymers, and cement) that tends to set when water is encountered. Other solutions include aqueous fluids that set into stiff gels, such as crosslinked, water-soluble, organic polymers, or silicates, aluminum compounds, and other inorganic monomers that gel. Other solutions include resins and other non-aqueous fluids, or slurries of walnut shells, diatomaceous earth, silica flour, and/or other solids in aqueous or non-aqueous carrier fluids that plug indiscriminately. Non-compatible waters that precipitate upon meeting in the reservoir may also be utilized.

Conformance control (also referred to as profile modification) is a type of well treatment solution directed to improve the injection or production profile of a well. Conformance control encompasses procedures that enhance recovery efficiency, such as by reducing the proportion of water produced with the oil or gas. High water production (caused by permeability variations in a subterranean formation) may be addressed by reducing the permeability of a portion of the subterranean formation having high permeability and low oil or gas content.

Presently, oilfield service companies have implemented a number of methods for reducing the permeability of a portion of a subterranean formation. One method (sometimes referred to as permeability blocking) involves injecting a crosslinkable polymer to form a gel within the matrix of the subterranean formation that physically blocks fluid flow through the portion of the formation. Such method either (1) directs the fluid flow around the portion of the formation or (2) induces production from the non-drained portions. As a result, fluid flow is directed through other portions of the subterranean formation having lower permeability or higher oil saturation. The polymer compositions for use in this method are sometimes referred to as cross-linkable polymer compositions.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

Described herein is a method for reducing a permeability of at least one zone in a subterranean formation that includes introducing a treatment fluid to at least one permeable zone in a subterranean formation. The treatment fluid contains a solvent, a crosslinking agent and a water-soluble polymer that is a copolymer of an acrylamide monomer and an n-vinyl amide monomer, or a terpolymer of an acrylamide monomer, an n-vinyl amide monomer, and an acrylic-acid based monomer. The treatment fluid is then allowed to crosslink and form a gel in the zone.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
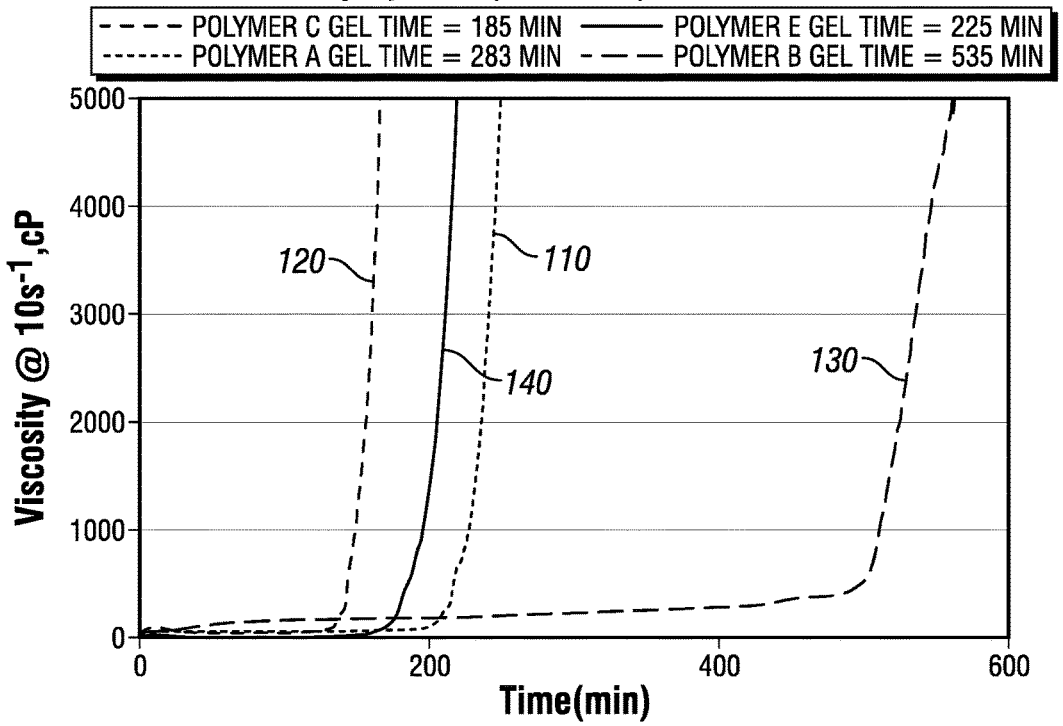
FIG. 1 is a viscosity graph according to at least a portion of an example implementation according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least, because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

As discussed above, described herein is a method for reducing a permeability of at least one zone in a subterranean formation. The subterranean formation may have a temperature of 79° C. or higher for the application of the treatment fluid described herein. However, other formulations may necessitate a longer delay (e.g., 24-48 hours) and would thus be applicable at lower temperatures. The treatment fluid contains a solvent, a crosslinking agent and a water-soluble polymer, which can be either a copolymer comprising acrylamide monomer or an n-vinyl amide monomer; a terpolymer comprising an acrylamide monomer, an n-vinyl amide monomer, and an acrylic-acid based monomer; and combinations thereof. The treatment fluid is then allowed to crosslink and form a gel in the zone.

Crosslinking Agent

As discussed above, the composition may include a crosslinking agent. Suitable crosslinking agents include water-soluble polymeric cross-linking agents, such as, for example, polyalkylamines. Examples of polyalkylamines include polyethylene imines and polypropylene imines and combinations thereof. Other examples include metal ions such as zirconium ion, cobalt ion, nickel ion, ferric ion, titanium IV ion, chromium III ion, aluminum ion and copper ion. The metal ions may be chelated to prevent cross-linking of the copolymer prematurely until higher temperatures are encountered in the formation.

As used herein, the phrases "crosslinkable fluid," "treatment fluid" or "fluid for treatment" (hereinafter generally referred to as a "treatment fluid" unless specified otherwise) mean, for example, a composition comprising water, a crosslinking agent and a water-soluble polymer, which includes any crosslinkable compound and/or substance with a crosslinkable moiety, (hereinafter "crosslinkable component") that may be substantially inert to any produced fluids (gases and liquids) and other fluids injected into the wellbore or around the wellbore, such as workover fluids, and a crosslinking composition which comprises a crosslinker, for example, to seal at least a portion of the area into which the treatment fluid is pumped.

The treatment fluid of the present disclosure may be a solution initially having a very low viscosity that can be readily pumped or otherwise handled. For example, the viscosity of the treatment may be from about 1 cP to about 1,000 cP, or be from about 1 cP to about 500 cP, or be from about 1 cP to about 100 cP at the treating temperature, which may range from a surface temperature to a bottom-hole static (reservoir) temperature, such as from about 4° C. to about 150° C., or from about 10° C. to about 135° C., or from about 25° C. to about 121° C.

Crosslinking the treatment fluid of the present disclosure generally increases its viscosity. As such, having the composition in the uncrosslinked state allows for pumping of a relatively less viscous fluid having relatively low friction pressures within the well tubing, and the gelation from crosslinking may be delayed in a controllable manner such that the properties of thickened treatment fluid are available after injection into the formation has finished. Such a transition to a crosslinked state may be achieved over a period of minutes or hours based on the particular molecular make-up of the treatment fluid and the temperature history, and results in the initial viscosity of the crosslinkable fluid increasing by at least two orders of magnitude. The crosslinking reaction converts a sol into a solid-like gel, where viscosity is no longer a useful description of the material. However, in the transition from sol to gel, viscosity is a good indicator of that transition.

Suitable solvents for use with the treatment in the present disclosure may be aqueous. Aqueous solvents may include at least one of fresh water, sea water, brine, mixtures of water and water-soluble organic compounds and mixtures thereof.

In some embodiments, the treatment fluid may initially have a low viscosity several times the value of the aqueous solvent, such as water. An initial low viscosity may allow the solution to travel through the wellbore or tubulars in the well with lower friction and affords ease of mixing at the surface. The rate at which the viscosity of the treatment fluid changes may be varied by the choice of the crosslinker and the water-soluble polymer employed in the treatment fluid. The viscosity of the crosslinkable fluid may also be varied by increasing or decreasing the amount of solvent relative to other components, or by other techniques, such as by employing salts or adjusting the pH. In embodiments, the solvent, such as an aqueous solvent, may represent up to about 97 weight percent of the treatment fluid, such as in the range of from about 90 to about 97 weight percent of the treatment fluid, or from about 93 to about 97 weight percent of the treatment fluid.

The crosslinker may be present at a concentration of from about 0.001 to about 5 weight percent about 0.01 to about 4 and from about 0.1 to about 3 weight percent. The lower limits apply more to metal ion concentrations while the higher limits are more useful for the polyalkylamine crosslinkers.

Polymer

As discussed above, the treatment fluid may include a water soluble polymer. Examples of water soluble polymers include a copolymer comprising acrylamide monomer and an n-vinyl amide monomer; a terpolymer comprising an acrylamide monomer, an n-vinyl amide monomer, and an acrylic acid-based monomer; and combinations thereof. Furthermore, the water soluble polymer does not include an ethylenically unsaturated ester such as those described in U.S. Pat. No. 6,196,317, the disclosure of which is incorporated by reference herein in its entirety.

The copolymer comprises an acrylamide monomer and an n-vinyl amide monomer. As used herein, the term "acrylamide" includes other unsaturated carboxylic acid monomers such as, for example, acrylamide, methacrylamide and acrylic ethanol amide.

N-Vinyl amides are well-known monomers in the art and a detailed description is therefore not required. N-Vinyl amides have a vinyl group attached to the nitrogen atom of an amide which may be further substituted in an analogous manner to the (meth)acrylate monomers. Examples of n-vinyl amide monomers include N-vinyl caprolactam (NVC), N-vinyl carbazole and N-vinyl-2-pyrrolidone (NVP).

The copolymer can contain from about 5 to about 70 mole percent of the acrylamide monomer and from about 30 to about 95 mole percent of the N-vinyl amide monomer. Furthermore, the copolymer can contain from about 20 to about 70 mole percent of the acrylamide monomer and from about 30 to about 80 mole percent of the N-vinyl amide monomer, or the copolymer can contain from about 40 to about 60 mole percent of the acrylamide monomer and from about 40 to about 60 mole percent of the N-vinyl amide monomer. The copolymer may be a block or non-block copolymer, a regular or random copolymer or a graft copolymer whereby the N-vinyl amide units are grafted onto a polymerized acrylamide monomer On the low end, the present inventors believe that 30 mole percent of N-vinyl amide still leaves many acrylamide units next to an n-vinyl amide monomeric unit so hydrolysis will be hindered. Furthermore, at 90 mole percent, the number of acrylamide units is reduced to 10% or less and the nucleophilic attack will be more hindered. For example, if the n-vinyl amide monomeric unit was 95 mole percent, then the conversion of acrylamide to acrylate by hydrolysis would have to be 100 percent efficient to reach the 5 mole percent acrylate content needed for gelation from crosslinking. As such, 90 mole percent of the n-vinyl amide monomeric unit appears reasonable as an upper limit.

The present inventors further surmise that another potential advantage of having a polymer with a large amount of N-vinyl amide monomers is that hydrolysis may be slowed down in the case where the acrylamide content in the formulation exceeds 40 mole percent. In other words, the long term stability of the polymer in the presence of divalent ions (at a concentration greater than 2000 mg/L) can be compromised if the original acrylamide content is more than 40 mole percent and hydrolysis converts this to 40 mole percent acrylate. The inclusion of N-vinyl amide monomers in the polymer effectively prevents the polymer from reaching this 40 mole percent threshold, which provides initial delay and allows use of the polymer at higher temperature. In addition, the long term stability of the polymer may be enhanced in pertinent real world applications such as, for example, reservoirs with resident brine containing large concentrations of calcium and magnesium ions.

In order to decrease the crosslinking rate of the treatment fluid and increase its gel strength after it is cross-linked, a terpolymer of the above described acrylamide monomer, N-vinyl amide monomer and acrylic acid-based monomer can be substituted for the above described copolymer. Suitable examples of acrylic acid based monomers include an acrylic acid, sodium acrylate, potassium acrylate, ammonium acrylate, methyl acrylate, ethyl acrylate, propyl acrylate, hydroxyethyl acrylate, hydroxypropyl acrylate, and glycidyl acrylate. The acrylic acid-based monomer can also be a methacrylic acid-based monomer, such as, for example, methacrylic acid, sodium methacrylate, potassium methacrylate, ammonium methacrylate, methyl methacrylate, ethyl methacrylate, propyl methacrylate, butyl methacrylate, hydroxyethyl methacrylate, hydroxypropyl methacrylate, and glycidyl methacrylate.

The terpolymer can contain from about 0.01 to about 70 mole percent of the acrylamide monomer, from about 30 to about 90 mole percent of the N-vinyl amide monomer and from about 0.01 to about 10 mole percent of the acrylic-acid based monomer, with the provision that the sum of the acrylamide and acrylic acid based monomers should be about 5% or more. The terpolymer can be a block or non-block polymer, a regular or random polymer or a graft polymer.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

EXAMPLES

Example 1

A number of polymers (referred to herein as "Polymer A", "Polymer C", "Polymer E", "Polymer B", "Polymer F" and "Polymer D") were tested for their ability to delay gelation at temperatures above 92° C. (200° F.) with good working times, mature gel times, extrusion pressures, and longer term stability at temperature. Furthermore, "Polymer B" is representative of the polymers described in the below claims, while the remaining polymers are comparative examples. The properties of these polymers are summarized below in Table 1.

TABLE 1

Properties of solution polymers formulated to limit hydrolysis

| Batch | Polymer A | Polymer C | Polymer E | Polymer B | Polymer F | Polymer D |
|---|---|---|---|---|---|---|
| N-vinyl pyrrolidone (NVP) conc., mole % | 0 | 0 | 0 | 48.5 | 0 | 0 |
| Acrylic acid conc., mole % | 0 | 1 | 0 | 3 | 5 | 6 |
| Acrylamide conc., mole % | 100 | 99 | 95 | 48.5 | 95 | 94 |
| t-butyl acrylate ester, mole % | 0 | 0 | 5 | 0 | 0 | 0 |

Also note that once the tertiary butyl ester hydrolyzes off (Polymer E), the polymer becomes a polyacrylamide copolymer with about 5% hydrolysis, similar to Polymer F or Polymer D.

Gel Time

Four gel fluids were prepared by first forming a solution containing 4.7 wt. % of polymer (Polymer C, Polymer E, Polymer A and Polymer B) and 0.61 wt. % of polyethylene imine (PEI) in tap water. The solutions were prepared by first adding the tap water to a beaker and stirring the solution with an overhead stirrer at 200 rpm. The proper amount of the solution polymer was added to give a final active weight present of polymer of 4.7%, followed by stirring for one minute. Next, the proper amount of solution crosslinker was added to give a final active weight percent of 0.61%. Stirring was done for one minute. About 50 ml of the mixed solution was then used for gel time measurement.

The gel time of these four solutions was measured with a Grace 5600 viscometer under constant but low shear (a B5 bob and R1 rotor spinning at a rate to give 10 s$^{-1}$ shear to the fluid). After sample loading, the fluids were then pressurized with about 300 psi of nitrogen to prevent boiling and the fluid temperature was increased to 107° C. (225° F.) in about 20 minutes. This gelation measurement method is described in further detail in Reddy, B. R. et al. "A Natural Polymer-Based Cross-Linker System for Conformance Gel Systems". SPEJ pp. 99-106. Paper SPE 84937. The gel time is defined to occur at the inflection or undulation point measured on the rising portion of the curve.

In light of the effect of initial acrylate content, FIG. 1 shows the longer gelation time for polymer A 110 (a homopolymer of acrylamide with 0% acrylate) relative to polymer C 120 (a copolymer of acrylic acid and acrylamide), which has an initial content of 1% of an acrylic acid monomer. These polymers hydrolyze to the level of 5% faster than the Polymer B 130 hydrolyzes from 3 to 5%. This is evidence of steric hindrance from the bulky NVP group on Polymer B that limits the rate of hydrolysis.

FIG. 1 also shows that polymer E 140 with the tertiary butyl acrylate monomer hydrolyzes faster than pure polyacrylamide, polymer A 110. Thus, the polymer described in U.S. Pat. No. 6,192,986 (represented herein as Polymer E) has a limited ability to delay hydrolysis to the point where gelation from crosslinking can occur but polymer B shows much longer delay, despite starting from 3% acrylate content. Thus, polymer B will offer much longer working time and allow its use in higher temperature applications versus polymer E, A, or C, which all hydrolyze quicker than polymer B to yield a level of hydrolysis for gelation to occur.

An additional fluid was prepared (Example 2a) containing 5.0 wt. % of Polymer and 1.4 wt. % of PEI in tap water. Six additional fluids were prepared in the concentrations described below in Table 2). Example 2c included urea as a delay agent.

TABLE 2

Figure 2:
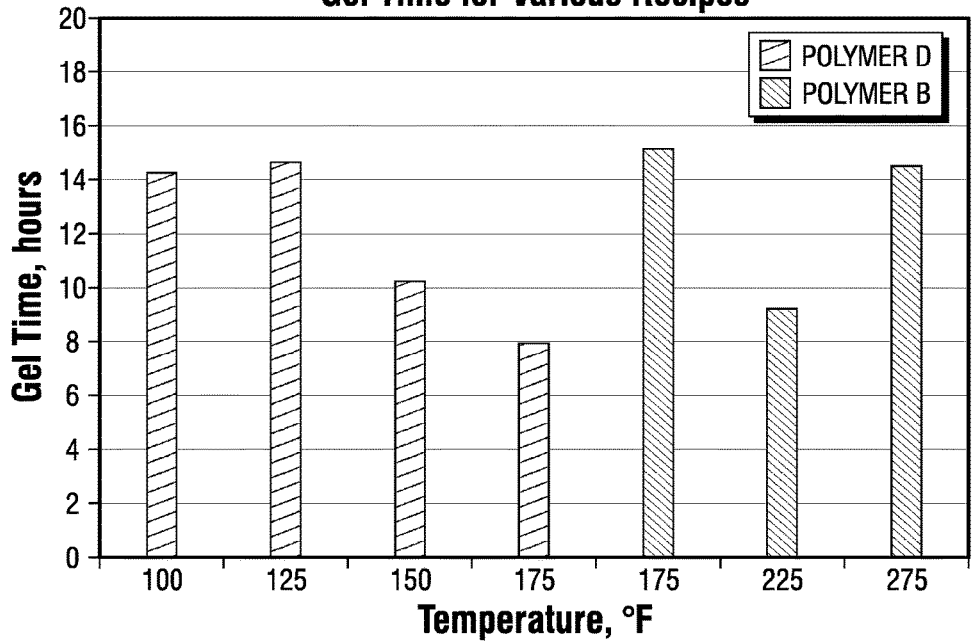
FIG. 2 is a graph comparing the gel times for various gels according to at least a portion of an example implementation according to one or more aspects of the present disclosure.

Gel recipes for FIG. 2 using active wt. %

| | Polymer D, active wt. % | Polymer B, active wt. % | PEI, active wt. % | Urea, active wt. % | Temperature ° C. |
|---|---|---|---|---|---|
| Comp Ex. 2a | 5.6 | 0 | 2.9 | 0 | 38 |
| Comp Ex. 2b | 5.6 | 0 | 1.4 | 0 | 52 |
| Comp Ex. 2c | 5.6 | 0 | 0.86 | 0 | 66 |
| Comp Ex. 2d | 5.6 | 0 | 0.6 | 0 | 79 |
| Example 2a | 0 | 5.0 | 1.4 | 0 | 79 |
| Example 2b | 0 | 5.0 | 0.7 | 0 | 107 |
| Example 2c | 0 | 5.0 | 0.3 | 0.3 | 135 |

FIG. 2 (and Table 2) described how gel times are tunable to allow the well to be returned to production the day following the treatment. Polymer D is useful for low temperature applications and the crosslinker concentration is reduced as the temperature increases to provide sufficient delay and gel times of less than 24 hours. At higher temperatures of 79° C. and above, polymer D does not allow sufficient delay and gelation is mature after a few hours that can restrict the injection. In contrast, polymer B shows longer gel times at high temperatures and sufficient delay exists to allow injection of the required volumes of treatment fluid. More specifically, the ability to tune gel times provides a number of benefits, such as, for example, (1) reducing the expense of having a coiled tubing unit or workover rig on location, (2) returning the well to production faster, which increases revenue, and (3) improving the overall economics of the treatment.

Example 3

Bottle Testing

Bottle testing is the traditional method for screening gel recipes for suitable gel time and stability at temperature. Table 3 below shows the gel rating systems developed by Marathon and typically employed by practitioners testing polymeric gels.

Bottle tests were initially used to screen a number of polymers for delay at 225° F. [107° C.]. A number of polymers were discarded because they failed to gel in 2 days including those prepared with AMPS (ATBS) monomer and a hydrolyzable ester, which is described in U.S. Pat. No. 6,196,317, the disclosure of which is incorporated by reference herein in its entirety

TABLE 3

Marathon gel strength codes

| Code | Description |
|---|---|
| A | No detectable gel formed: The gel appears to have the same viscosity (fluidity) as the original polymer solution and no gel is visually detectable. |

TABLE 3-continued

Marathon gel strength codes

| Code | Description |
|---|---|
| B | Highly flowing gel: The gel appears to be only slightly more viscous (less fluid) than the original polymer solution. |
| C | Flowing gel: Most of the obviously detectable gel flows to the bottle cap upon inversion. |
| D | Moderately flowing gel: Only a small portion (about 5 to 15%) of the gel does not readily flow to the bottle cap upon inversion--usually characterized as a "tonguing" gel (i.e., after hanging out of jar, gel can be made to flow back into bottle by slowly turning bottle upright). |
| E | Barely flowing gel: The gel can barely flow to the bottle cap and/or a significant portion (>15%) of the gel does not flow upon inversion. |
| F | Highly deformable non-flowing gel: The gel does not flow to the bottle cap upon inversion. |
| G | Moderately deformable non-flowing gel: The gel flows about half way down the bottle upon inversion. |
| H | Slightly deformable non-flowing gel: The gel surface only slightly deforms upon inversion. |
| I | Rigid gel: There is no gel-surface deformation upon inversion. |
| J | Ringing rigid gel: A tuning-fork-like mechanical vibration can be felt after tapping the bottle. |

Note:
For graphs, the letters A-J are replaced with corresponding numbers 1-10. Separated low viscosity liquid (syneresed water) is accounted for by adding the percentage after the letter grade.

A polymeric fluid was prepared (Example 3a) containing 4.6 wt. % of Polymer B and 1.2 wt. % of PEI in tap water. Two additional polymeric fluids were prepared (Comparative Examples 3a and 3b) in the exact same manner as Example 3a except that the polymer was changed (Polymer A for Comparative Example 3a and Polymer C for Comparative Example 3b). Three additional polymeric fluids were prepared in the same manner as described above, except that the polyethylene imine concentration was increased to 2.3 wt. %. The details for these six polymeric fluids are described below in Table 4 and all percentages below are in active weight percent.

TABLE 4

Gel observations for polymers at elevated PEI concentrations in 2 wt. % KCl at 107° C.

| | | | Gel observations with time | | | | | | |
|---|---|---|---|---|---|---|---|---|---|
| Example | Formulation | pH | 2 hr | 3 hr | 6 hr | 2 d | 7 d | 14 d | 47 d |
| Comp. Ex. 3a | 4.7% A, 1.2% PEI | 10.8 | A | F | I | J | J | J | J |
| Comp. Ex. 3b | 4.6% C, 1.2% PEI | 10.8 | B | F | I | J | J | J | J |
| Example 3a | 4.6% B, 1.2% PEI | 10.8 | A | A | A | I | J | J | J |
| Comp. Ex. 3c | 4.6% A, 2.3% PEI | 10.8 | B | I | J | J | I20 | I20 | I50 |
| Comp. Ex. 3d | 4.5% C, 2.3% PEI | 10.9 | B | H | J | J | 120 | 120 | I50 |
| Example 3b | 4.5% B, 2.3% PEI | 10.9 | A | A | A | I | J | J | I |

Table 4 shows that at increased crosslinker concentrations, Polymer B is more robust to an increased crosslinker concentration in the long term. More specifically, although formulations made using Polymer A or C show long term stability at 1.2 wt. % PEI (Comparative Examples 3a and 3b), massive syneresis occurs for formulations employing these polymers at increased concentration of 2.3 wt. % PEI indicating instability (Comparative Examples 3c and 3d). This may directly result from the limited hydrolysis of Polymer B as compared to Polymer A and Polymer C. More hydrolysis leads to more crosslinking which shrinks the network and expels free water. In addition, the data shows gel stability for all examples except Comp. Ex 3c and 3d. Gel stability is a property for a rigid gel. For the rigid gels described herein, maintenance of a gel rating of H, I or J with less than 10% syneresis for an extended aging time at temperature is defined herein as gel stability. Referring to Table 4, Example 3a and 3b as well as Comp. Ex. 3a and 3b show stability for 47 days, but Comp. Ex 3c and 3d are unstable at 7 days.

Example 4

Working Time

Polymer B also shows good working time which is the available pumping time. As gelation occurs, the material begins to form a network structure that starts to plug porous media, but does not yet reflect a viscosity increase or visible indication of gelation. As the reaction continues and more crosslinking bonds are formed, the material begins to show gel character both visibly and in viscosity. When the viscosity reaches a large value (e.g., 2500 cP or more, a mature gel has been formed that is capable of shutting off permeability in porous media. Note that the viscosity is not a good indicator of the gel property but can indicate the transition from a solution to a gelled state. Thus, the actual level of viscosity is not indicative of the true gel property and the level can be dependent upon the interaction of the gelling fluid with the bob and rotor. For example, the gelled solution may yield at the bob and move with the rotor in one case and in another the gel may fracture near the rotor, giving a different indication of viscosity. The mature gel formulation is also confirmed by a visual gel rating of H, I or J for a rigid gel formulation, which is used for the intended application. Working time thus indicates the early step of crosslinking and measures the time that injectivity into the formation is still possible. In the present applications, the injectivity of the aging solution was monitored using periodic injections through a filter paper of 22 micron nominal size (Whatman #54) using a differential pressure of 200 psi. The working time is calculated as the time required for injectivity to have decreased by one half of its initial value. Working time therefore dictates how much volume of treatment can be injected at a given flow rate and also provides guidance should an unexpected shutdown occur as to how long the material can remain in the well before gelling. For example, if the working time is 4 hours, and the injection plan should be completed in 2 hours, there is a contingency to allow an emergency shutdown for up to 2 hours before resuming injection to complete the treatment. If the shutdown lasts longer, the material could set in the tubing causing a major problem. Knowing this information, an operator can arrange for a contingency plan to prevent gel from setting in the tubing. Polymer P is a solid polymer and was hydrated in tap water before the crosslinker solution was added. When KCl is used, it is added to the tap water before mixing in the polymer.

Table 5 below shows the working times for a number of gel formulations. The gel formulations were prepared by combining the polymer (Polymer D, Polymer F or Polymer B) with polyethylene imine in tap water to give the indicated active wt. % described below. Polymer P is a solid polymer and was hydrated in tap water before the crosslinker solution was added. When KCl is used, it is added to the tap water before mixing in the polymer.

TABLE 5

Working times for various formulations, pH = 10.8

| D wt. % | B wt. % | PEI wt. % | P wt. % | KCl wt. % | Temperature ° F. [° C.] | Working Time Min |
|---|---|---|---|---|---|---|
| 5.26 | 0 | 2.97 | 0 | 0 | 100 [37] | 401 |
| 5.62 | 0 | 3.24 | 0 | 0 | 100 [37] | 586 |
| 0 | 0 | 2.22 | 5.2 | 0 | 100 [37] | 361 |
| 5.57 | 0 | 2.91 | 0 | 0 | 125 [52] | 371 |
| 4.85 | 0 | 1.213 | 0 | 0 | 125 [52] | 572 |
| 0 | 0 | 0.91 | 5.2 | 0 | 125 [52] | 324 |
| 5.69 | 0 | 2.76 | 0 | 0 | 150 [66] | 313 |
| 4.81 | 0 | 4.52 | 0 | 0 | 150 [66] | 279 |
| 0 | 0 | 0.57 | 5.2 | 0 | 150 [66] | 155 |
| 5.67 | 0 | 0.34 | 0 | 0 | 175 [79] | 469 |
| 4.81 | 0 | 0.62 | 0 | 0 | 175 [79] | 218 |
| 0 | 0 | 0.35 | 5.1 | 0 | 175 [79] | 102 |
| 5.01 | 0 | 0.31 | 0 | 0 | 200 [93] | 281 |
| 5.02 | 0 | 0.27 | 0 | 0 | 200 [93] | 363 |
| 0 | 4.92 | 1.01 | 0 | 0 | 200 [93] | 465 |
| 0 | 4.8 | 1.51 | 0 | 0 | 200 [93] | 266 |
| 0 | 4.7 | 0.61 | 0 | 0 | 225 [107] | 408 |
| 0 | 4.93 | 0.44 | 0 | 1.5 | 250 [121] | 269 |
| 0 | 4.96 | 0.32 | 0 | 1.5 | 250 [121] | 434 |
| 0 | 5.03 | 0.45 | 0 | 0 | 250 [121] | 268 |
| 0 | 5.05 | 0.39 | 0 | 0 | 250 [121] | 388 |

As shown above in Table 5, suitable working times of more than four hours are achievable even at temperatures of 250° F. using polymer B. Furthermore, the working time for polymer P dropped to 102 minutes at 175° F. [79° C.] making it difficult to use at this temperature or higher temperatures. Polymer D shows a similar pattern to polymer P. Even though the crosslinker concentration is reduced as temperature increases from 37 to 79° C., the working time for polymer D and P are decreasing. If the crosslinker concentration is lowered much more, the gel will be weak and not useful. Based on gel times (which exceed the working time), polymer E is expected to be similar to polymer P and would not be suitable for use at 93° C. or above without a delay agent. Thus, polymer B shows superior delay and usefulness in wells with temperatures above about 79° C.

Example 5

Extrusion Pressure (Gel Strength)

Figure 3:
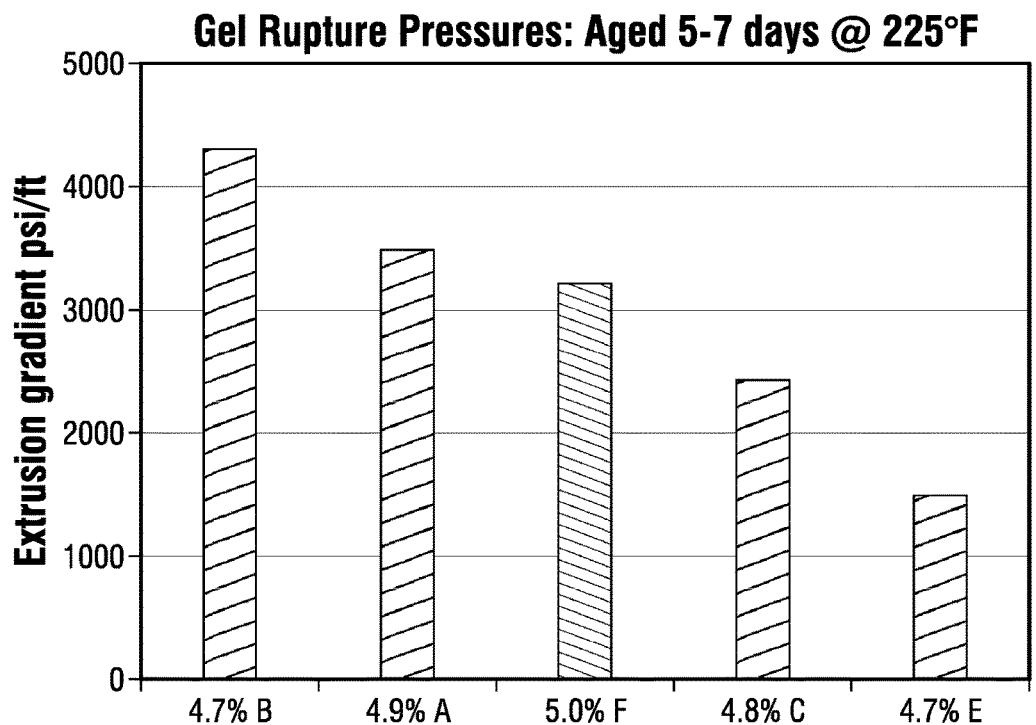
FIG. 3 is a graph comparing the extrusion pressures for different gels according to at least a portion of an example implementation according to one or more aspects of the present disclosure.

FIG. 3 shows the gel prepared with the new polymer B (example 5a) also exhibits higher gel strength than either those made with polyacrylamide and PEI (Comp. Ex. 5b and 5d), those prepared with tertiary butyl acrylate/acrylamide copolymer (polymer E) using PEI crosslinker or another crosslinking system (Comp. Ex. 5c). The details for these gel formulations are shown below in Table 6.

TABLE 6

Recipes for the data shown in FIG. 3

| Example | Formulation |
|---|---|
| Example 5 a | 4.7% B, 0.61% PEI |
| Comp Ex. 5b | 4.9% A, 0.61% PEI |
| Comp Ex. 5c | 5.0% F, 0.3% hexamine, 0.6% phenyl acetate |
| Comp Ex. 5d | 4.8% C, 0.61% PEI |
| Comp Ex. 5e | 4.7% E, 0.61% PEI |

Example 6

Gelation in the Presence of $H_2S$ The above examples were each conducted in the absence of hydrogen sulfide ($H_2S$). These tests were constructed to evaluate the gel in an atmosphere with 30% $H_2S$ and 70% methane by mole percent. The test consisted of ensuring the gelation occurred within 24 hours and then determining if gelation could be delayed for at least six hours. In other words, two runs with a pressure vessel were performed, the first aged for 24 hours and the second for six hours. The observation of the resulting solutions after decompression, cooling, and degassing at atmospheric conditions provided information on gelation.

24 Hour Testing

A pre-heated pressure vessel (225° F. [107° C.] was loaded with open top vials containing gelant and subsequently pressurized to 4500 psi with a gas comprised of 70% methane and 30% $H_2S$. For the first test, the experiment lasted 24 hours. The test was then repeated with new samples aged for six hours. The details are described below in Table 7.

TABLE 7

Gel ratings without $H_2S$ and physical description of gels formed with $H_2S$ under pressure

| Experiment | Polymer concentration and pH, wt. % | PEI concentration, wt. % | 24 hr. gel rating - no $H_2S$ | Physical state after $H_2S$ exposure for 24 hours @ 225° F. and 4500 psi |
|---|---|---|---|---|
| 1 | 4.6% B, pH 9 | 0.41% | A | Liquid and foamy |
| 7 | 5.2% B, pH 10 | 0.40% | F | elastic gel, chunky, small white layer near bottom, more yellow top |
| 3 | 4.3% B, pH 9 | 1.1% | H | Elastic gelled foam |
| 14 | 4.4% A, pH 10 | 1.1% | J | elastic gel, chunky |
| 8 | 4.8% B, pH 10 | 1.1% | F | elastic gel, chunky, small white layer near bottom, more yellow top |

TABLE 7-continued

Gel ratings without H$_2$S and physical description
of gels formed with H$_2$S under pressure

| Experiment | Polymer concentration and pH, wt. % | PEI concentration, wt. % | 24 hr. gel rating - no H$_2$S | Physical state after H$_2$S exposure for 24 hours @ 225° F. and 4500 psi |
|---|---|---|---|---|
| 5 | 3.9% B, pH 9 | 2.0% | I | Elastic gelled foam |
| 11 | 4.4% B, pH 10 | 1.9% | J | elastic gel, chunky, small white layer near bottom, more yellow top |
| 17 | 4.0% A, pH 10 | 2.0% | J | elastic gel, chunky |

As shown above in Table 7, gels formed in the presence of H$_2$S at 4500 psi and 225° F. after 24 hours for nearly all gel formulations.

Figure 4:
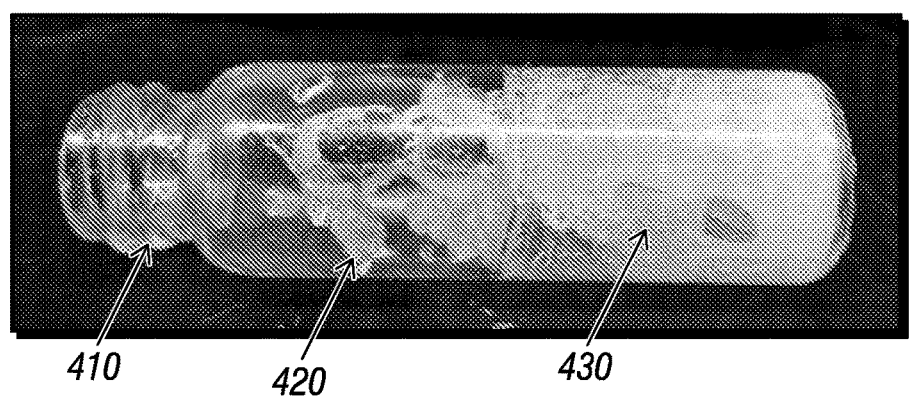
FIG. 4 is a photograph according to at least a portion of an example implementation according to one or more aspects of the present disclosure.

Table 7 further shows gel ratings for the formulations without H$_2$S and their gelation roughly corresponds with the physical form present in the H$_2$S experiments. The varied concentration range suggests the gel system is robust and can form elastic gels under H$_2$S conditions with polymer loading varied from 3.9 to 5.2 active wt. % and PEI crosslinker concentrations from 0.4 to 2.0 active wt. %. Such results are consistent with bottle testing results described above performed in the absence of H$_2$S wherein formulations with polymer B at lower crosslinker concentrations were not as fully gelled as those made with polymer A. Some foaming and fracturing of the formed gel were apparent when dissolved gas escaped from the gel as the pressure vessel was bled down. FIG. 4 shows a vial 410 with fractured chunks 420 of the gel 430 after decompression but verifies the gel 430 is an elastic, strong gel.

6 Hour Testing

The six hour tests are below summarized in Table 8.

TABLE 8

Gel ratings without H$_2$S and physical description
of gels formed with H$_2$S under pressure

| Experiment | Polymer concentration and pH, wt. % | PEI concentration, wt. % | 6 hr. gel rating - no H$_2$S | Physical state after H$_2$S exposure for 6 hours @ 225° F. and 4500 psi |
|---|---|---|---|---|
| 19 | 4.7% B, pH 10 | 0.41% | A | not gelled |
| 20 | 4.7% B, pH 10 | 1.2% | A | not gelled |
| 21 | 4.6% B, pH 10 | 2.4% | A | not gelled |
| 23 | 5.1% B, pH 10 | 2.3% | A | not gelled |
| 24 | 4.9% A, pH 10 | 0.41% | B-H | some gelled foam, some gel |
| 25 | 5.4% A, pH 10 | 1.5% | I | Gel with slight foam |

As shown above in Table 8, the polymer B formulations did not gel while both formulations with polymer A showed some gelation indicating the exceptional delay afforded by polymer B. Experiments 21 and 23 (Polymer B) used very aggressive concentrations of PEI crosslinker and still did not gel in the six hour testing period, whereas the polymer A formulations used lower PEI concentrations and did gel.

Based upon the above results, the presently claimed polymers (e.g., Polymer B) meet the general criteria of no gelation for at least 6 hours and fully gelled before 24 hours for most concentrations of polymer and crosslinker when mixed in tap water and aged at 225° F. and 4500 psi in a gas containing 30% H$_2$S and 70% methane. In contrast, other polymers such as Polymer A gelled too quickly (less than 6 hours) and would require additional materials (e.g., salts or pH reducing agents) to achieve a suitable delay. Furthermore, it is unclear if the solution with polymer A could meet the 6 hour criteria. By comparison with gels made without H$_2$S, the presence of H$_2$S did not substantially alter the gel reaction and excessive amounts of crosslinker were not required.

For crosslinking at higher temperatures (225° F.), polymer B offers the following benefits relative to tertiary butyl acrylate/acrylamide or acrylate/acrylamide copolymers.

(1) Polymer B gels offer more delay in gelation extending the gelation to six or more hours at temperatures above 79° C. This can be helpful for placement into matrix with coiled tubing as rates are often limited by friction pressure or formation permeability to 1 barrel per minute or less. Because larger volume treatments of 100 bbl will take two to three hours, a working time of more than six hours allows for contingency in case the coil unit has problems (e.g., pump failure, packer issues, etc.). Further, working time determination shows the polyacrylamides A and C have about one hour of injectivity whereas polymer B has over five hours, despite the longer gel times recorded for both systems. The fluids were each gelled on day two, which minimizes the time that a coiled tubing unit or workover equipment remains on location.

(2) Polymer B has better tolerance of a range of crosslinker concentrations. Polymer B can handle 2.3% PEI. In contrast, polyacrylamides become overcrosslinked, unstable, and expel free water with 2.3% PEI.

(3) Polymer B has better resistance to hydrolysis than polyacrylamides, which means the gel is less susceptible to divalent ion intrusion that can lead to gel failure. Polymer B has 3% acrylate, so should resist precipitation by divalent ions and interactions with divalent ions that can lead to syneresis because of the lower level of acrylate that can be achieved via hydrolysis.

(4) Polymer B, crosslinked by PEI, gels in the presence of high concentrations of H$_2$S (30% in gas phase) with little to no effect on the gelation time.

(5) A higher strength gel can be made using Polymer B crosslinked with PEI than for other polymers or other organic crosslinking systems as evidenced by the gel extrusion test. Gels that can withstand more than 4000 psi/ft of applied gradient result from this formulation.

In view of the entirety of the present disclosure, including the figures and the claims, a person having ordinary skill in the art will readily recognize that the present disclosure introduces a method for reducing a permeability of at least one zone in a subterranean formation, the method comprising: introducing a treatment fluid to at least one permeable zone in a subterranean formation, the treatment fluid comprised of a solvent, a crosslinking agent and a water-soluble polymer selected from the group consisting of: a copolymer comprising acrylamide monomer and an n-vinyl amide monomer; a terpolymer comprising an acrylamide monomer, an n-vinyl amide monomer, and an acrylic-acid based monomer; and combinations thereof, and allowing the treatment fluid to crosslink and form a gel in the zone.

The solvent may be an aqueous solvent comprising at least one of fresh water, sea water, brine, mixtures of water and water-soluble organic compounds and mixtures thereof.

The crosslinking agent may be a polyalkylamine. For example, the polyalkyl amine may be a polyethylene imine, a polypropylene imine, or mixtures thereof. Furthermore, the crosslinking agent may be present at a concentration of from about 0.001 to about 5 weight percent or from about 0.1 to about 4 weight percent.

The N-vinyl amide monomer of the copolymer or the terpolymer may be N-vinyl caprolactam (NVC), N-vinyl carbazole or N-vinyl-2-pyrrolidone (NVP).

The water soluble polymer may be a copolymer comprised of about 5 to about 70 mole percent of the acrylamide monomer and from about 30 to about 95 mole percent of the N-vinyl amide monomer. The water soluble polymer may also be a terpolymer comprised of about 0.01 to about 70 mole percent of the acrylamide monomer, from about 30 to about 90 mole percent of the N-vinyl amide monomer and from about 0.01 to about 10 mole percent of the acrylic-acid based monomer. The acrylic-acid based monomer may be selected from the group consisting of acrylic acid, sodium acrylate, potassium acrylate, ammonium acrylate, methacrylic acid, sodium methacrylate, potassium methacrylate and ammonium methacrylate.

The subterranean formation may have a temperature of 79° C. or higher and may be comprised of limestones or dolomites or mixtures thereof, or sandstones. Furthermore, the water-soluble polymer may delay gelation for at least six (6) hours.

A gel may be formed in the presence of waters containing divalent ions exceeding 2000 mg/L.

Although the preceding description has been described herein with reference to particular means, materials and embodiments, it is not intended to be limited to the particulars disclosed herein; rather, it extends to all functionally equivalent structures, methods, uses, such as are within the scope of the appended claims.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method for reducing a permeability of at least one zone in a subterranean formation, the method comprising:
   introducing a treatment fluid to at least one permeable zone in the subterranean formation, the treatment fluid comprising a solvent, a crosslinking agent and a water-soluble polymer selected from the group consisting of:
   a copolymer comprising acrylamide monomer and an n-vinyl amide monomer; a terpolymer comprising an acrylamide monomer, an n-vinyl amide monomer, and an acrylic-acid based monomer; and combinations thereof, and
   allowing the treatment fluid to crosslink and form a gel in the presence of $H_2S$ gas in the zone.

2. The method of claim 1, wherein the solvent is an aqueous solvent comprising at least one of fresh water, sea water, brine, mixtures of water and water-soluble organic compounds and mixtures thereof.

3. The method of claim 1, wherein the crosslinking agent is a polyalkylamine.

4. The method of claim 3, wherein the polyalkylamine is a polyethylene imine, a polypropylene imine, or mixtures thereof.

5. The method of claim 4, wherein the crosslinking agent is present at a concentration of from about 0.1 to about 4 weight percent.

6. The method of claim 1, wherein the crosslinking agent is present at a concentration of from about 0.001 to about 5 weight percent.

7. The method of claim 1, wherein the N-vinyl amide monomer is N-vinyl caprolactam (NVC), N-vinyl carbazole or N-vinyl-2-pyrrolidone (NVP).

8. The method of claim 1, wherein the water soluble polymer is the copolymer comprised of about 5 to about 70 mole percent of the acrylamide monomer and from about 30 to about 95 mole percent of the N-vinyl amide monomer.

9. The method of claim 1, wherein the water soluble polymer is a terpolymer comprised of about 0.01 to about 70 mole percent of the acrylamide monomer, from about 30 to about 90 mole percent of the N-vinyl amide monomer and from about 0.01 to about 10 mole percent of the acrylic-acid based monomer.

10. The method of claim 1, wherein the water soluble polymer is a terpolymer and the acrylic-acid based monomer is selected from the group consisting of acrylic acid, sodium acrylate, potassium acrylate, ammonium acrylate, methacrylic acid, sodium methacrylate, potassium methacrylate and ammonium methacrylate.

11. The method of claim 1, wherein the subterranean formation comprises limestones, dolomites or mixtures thereof.

12. The method of claim 1, wherein the subterranean formation comprises sandstones.

13. The method of claim 1, wherein the water soluble polymer delays gelation for at least six (6) hours.

14. The method of claim 1, wherein the water soluble polymer is a terpolymer comprised of about 0.01 to about 70 mole percent of the acrylamide monomer, from about 30 to about 90 mole percent of the N-vinyl amide monomer and from about 0.01 to about 10 mole percent of the acrylic-acid based monomer and the subterranean formation has a temperature of 79° C. or higher.

15. The method of claim 1, wherein the water soluble polymer is a terpolymer comprised of about 0.01 to about 70 mole percent of the acrylamide monomer, from about 30 to about 90 mole percent of the N-vinyl amide monomer and from about 0.01 to about 10 mole percent of the acrylic-acid based monomer and a stable gel is formed in the presence of waters containing divalent ions exceeding 2000 mg/L.

16. The method of claim 1, wherein the $H_2S$ gas is present at about 4500 psi.

17. The method of claim 1, wherein temperature of the subterranean formation is about 225° F.

* * * * *